(12) United States Patent
Lyu et al.

(10) Patent No.: US 10,727,985 B2
(45) Date of Patent: Jul. 28, 2020

(54) CONTROL INFORMATION SENDING METHOD AND COMMUNICATIONS DEVICE

(71) Applicant: HUAWEI TECHNOLOGIES CO., LTD., Shenzhen (CN)

(72) Inventors: Yongxia Lyu, Ottawa (CA); Lei Guan, Beijing (CN); Jiehua Xiao, Shanghai (CN)

(73) Assignee: HUAWEI TECHNOLOGIES CO., LTD., Shenzhen (JP)

( * ) Notice: Subject to any disclaimer, the term of this patent is extended or adjusted under 35 U.S.C. 154(b) by 0 days.

(21) Appl. No.: 15/921,663

(22) Filed: Mar. 15, 2018

(65) Prior Publication Data
US 2018/0205504 A1 Jul. 19, 2018

Related U.S. Application Data

(63) Continuation of application No. PCT/CN2015/089665, filed on Sep. 15, 2015.

(51) Int. Cl.
| | | |
|---|---|---|
| *H04L 1/18* | (2006.01) | |
| *H04L 1/16* | (2006.01) | |
| *H04L 5/00* | (2006.01) | |
| *H04L 1/12* | (2006.01) | |

(52) U.S. Cl.
CPC ............ *H04L 1/1812* (2013.01); *H04L 1/16* (2013.01); *H04L 1/1829* (2013.01); *H04L 5/0055* (2013.01); *H04L 2001/125* (2013.01)

(58) Field of Classification Search
CPC ....... H04L 1/1812; H04L 1/16; H04L 1/1829; H04L 5/0055; H04L 2001/125
See application file for complete search history.

(56) References Cited

U.S. PATENT DOCUMENTS

| | | |
|---|---|---|
| 2013/0322397 A1 | 12/2013 | Lee et al. |
| 2014/0036814 A1 | 2/2014 | Zhang et al. |
| 2018/0241510 A1* | 8/2018 | Shen ............... H04L 1/1861 |

FOREIGN PATENT DOCUMENTS

| | | |
|---|---|---|
| CA | 2879201 A1 | 4/2014 |
| CN | 102904698 A | 1/2013 |
| CN | 103444106 A | 12/2013 |
| CN | 104604167 A | 5/2015 |
| CN | 104823499 A | 8/2015 |
| WO | 2014047860 A1 | 4/2014 |

OTHER PUBLICATIONS

NTT Docomo, Inc., "HARQ-ACK feedback for CA with up to 32 CCs", 3GPP TSG RAN WG1 Meeting #82, R1-154429, Beijing, China, Aug. 24-28, 2015, total 5 pages.

Lenovo, "HARQ-ACK codebook determination for Rel-13 eCA", 3GPP TSG RAN WG1 Meeting #82, R1-154503 Beijing, China, Aug. 24-28, 2015, total 4 pages.

\* cited by examiner

*Primary Examiner* — Michael Thier
*Assistant Examiner* — Brian P Cox
(74) *Attorney, Agent, or Firm* — Kilpatrick Townsend & Stockton LLP

(57) ABSTRACT

Embodiments of the present invention provide a control information sending method and a communications device. The embodiments of the present invention can resolve a problem that user equipment and a base station device have inconsistent understandings of a total original information bit quantity of a HARQ-ACK of multiple downlink carriers.

18 Claims, 7 Drawing Sheets

User equipment receives at least one piece of downlink control information sent by a base station, where each piece of downlink control information carries a count downlink allocation index DAI, the at least one piece of downlink control information further carries hybrid automatic repeat request-acknowledgement codebook indication information, and the hybrid automatic repeat request-acknowledgement codebook indication information is used to indicate a hybrid automatic repeat request-acknowledgement codebook size — Step 201

The user equipment generates the hybrid automatic repeat request-acknowledgement according to the count downlink allocation index of the downlink control information and the hybrid automatic repeat request-acknowledgement codebook size — Step 202

The user equipment sends the hybrid automatic repeat request-acknowledgement to the base station — Step 203

CONTROL INFORMATION SENDING METHOD AND COMMUNICATIONS DEVICE

CROSS-REFERENCE TO RELATED APPLICATIONS

This application is a continuation of International Application No. PCT/CN2015/089665, filed on Sep. 15, 2015, the disclosure of which is hereby incorporated by reference in its entirety.

TECHNICAL FIELD

Embodiments of the present invention relate to communications technologies, and in particular, to a control information sending method and a communications device.

BACKGROUND

Long Term Evolution (LTE for short) is Long Term Evolution of the Universal Mobile Telecommunications System (UMTS) technology standards that is formulated by the 3rd Generation Partnership Project (3GPP for short) organization. Key technologies such as Orthogonal Frequency Division Multiplexing (OFDM for short) and Multiple Input Multiple Output (MIMO for short) are introduced into the Long Term Evolution, obviously increase spectral efficiency and a data transmission rate, and have been widely developed in recent years. A Long Term Evolution-Advanced (LTE-A for short) system is a further evolved and enhanced system of an LTE system. In the LTE-A system, to satisfy a requirement of the International Telecommunication Union for a peak data rate of the fourth generation communications technology, a carrier aggregation (CA for short) technology is introduced, and is also referred to as a spectrum aggregation technology or a bandwidth extension technology. In carrier aggregation, spectrums of two or more component carriers are aggregated to obtain a wider transmission bandwidth, and the spectrums of the component carriers may be adjacent continuous spectrums, or may be nonadjacent spectrums within a same frequency band or even discontinuous spectrums within different frequency bands. LTE Rel-8/9 user equipment (UE) can access only one of the component carriers to receive and send data. However, LTE-A user equipment may access, according to a capability and a service requirement of the user equipment, multiple component carriers at the same time to receive and send data.

The LTE supports two duplex modes: frequency division duplex (FDD for short) and time division duplex (TDD for short). For the FDD, downlink and uplink transmission are performed on different carriers. For a TDD system, uplink and downlink transmission are performed on a same carrier at different times. Specifically, a carrier includes a downlink subframe, an uplink subframe, and a special subframe. The LTE currently supports seven types of different TDD uplink and downlink configurations.

The LTE implements an error detection and correction function by using a hybrid automatic repeat request (HARQ for short) mechanism. A downlink is used as an example. After UE receives a physical downlink shared channel (PDSCH for short), if the physical downlink shared channel is correctly received, the UE feeds back an acknowledgement (ACK for short) on a physical uplink control channel (Physical Uplink Control Channel, PUCCH for short); or if the physical downlink shared channel is not correctly received, the UE feeds back a negative acknowledgement (NACK for short) on a PUCCH. The LTE further supports a carrier aggregation (CA for short) technology, that is, a base station configures multiple carriers for one UE to improve a data rate of the UE. During CA, the multiple carriers sent by the base station are synchronously sent in terms of time. The UE may separately detect and schedule a physical downlink control channel (PDCCH for short) and a corresponding PDSCH of each carrier. A specific detection process of each carrier is similar to that in the foregoing case of a single carrier. The LTE system supports FDD CA, TDD CA, and FDD+TDD CA. The TDD CA is further classified into TDD CA having a same uplink and downlink configuration and TDD CA having different uplink and downlink configurations. In a CA mode, there is one primary carrier and at least one secondary carrier, and a PUCCH carrying an ACK/NACK is sent only on a primary carrier of the UE. When a hybrid automatic repeat request-acknowledgement HARQ-ACK of multiple downlink carriers is transmitted on one PUCCH channel or one PUSCH channel, joint coding is usually used. In the LTE system, uplink control signaling mainly has two coding manners: linear block code Reed Muller (RM for short) and convolutional code. In either coding manner, the base station can perform decoding correctly only when the base station knows a total original information bit quantity of joint coding when using a common decoding manner.

If the total original information bit quantity of the HARQ-ACK joint coding is calculated based on a quantity of PDSCHs on a downlink carrier that are detected by the UE, once a PDSCH on a downlink carrier is missed during detection, a quantity of carriers having PDSCHs that is understood by the UE is less than a quantity of carriers of PDSCHs actually sent by an eNB. However, the eNB does not know whether the UE has missed a PDSCH during detection, and how many PDSCHs are missed during detection. Therefore, the UE and the eNB have inconsistent understandings of the total original information bit quantity of the HARQ-ACK joint coding of multiple downlink carriers. Consequently, a fed back HARQ-ACK cannot be correctly decoded. Therefore, a problem that user equipment and a base station device have inconsistent understandings of a total original information bit quantity (a codebook size of a HARQ-ACK) of a HARQ-ACK of multiple downlink carriers urgently needs to be resolved.

SUMMARY

Embodiments of the present invention provide a control information sending method and a communications device, to resolve a problem that user equipment and a base station device have inconsistent understandings of a total original information bit quantity of a hybrid automatic repeat request-acknowledgement HARQ-ACK of multiple downlink carriers.

According to a first aspect, an embodiment of the present invention provides a control information sending method, including:

receiving at least one piece of control information sent by a device, where the at least one piece of control information carries hybrid automatic repeat request-acknowledgement codebook indication information, and the hybrid automatic repeat request-acknowledgement codebook indication information is used to indicate a hybrid automatic repeat request-acknowledgement codebook size;

generating the hybrid automatic repeat request-acknowledgement according to the hybrid automatic repeat request-acknowledgement codebook indication information; and sending the hybrid automatic repeat request-acknowledgement to the device, where a bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

With reference to the first aspect, in a first possible implementation of the first aspect, the hybrid automatic repeat request-acknowledgement codebook size includes at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

With reference to the first aspect or the first possible implementation of the first aspect, in a second possible implementation of the first aspect, the bit quantity of the hybrid automatic repeat request-acknowledgement codebook indication information is specifically 2 bits, 3 bits, or 4 bits.

With reference to any one of the first aspect or the first and the second possible implementations of the first aspect, in a third possible implementation of the first aspect, the control information further carries a count allocation index; and the generating the hybrid automatic repeat request-acknowledgement according to the hybrid automatic repeat request-acknowledgement codebook indication information includes:

generating the hybrid automatic repeat request-acknowledgement according to the count allocation index of the control information and the hybrid automatic repeat request-acknowledgement codebook size.

With reference to the third possible implementation of the first aspect, in a fourth possible implementation of the first aspect, the generating the hybrid automatic repeat request-acknowledgement according to the count allocation index of the control information and the hybrid automatic repeat request-acknowledgement codebook size includes:

determining a count allocation index of lost control information or a count allocation index of a code word according to the count allocation index and the hybrid automatic repeat request-acknowledgement codebook size, and generating the hybrid automatic repeat request-acknowledgement according to the received control information and the count allocation index of the lost control information or the count allocation index of the code word.

According to a second aspect, an embodiment of the present invention provides a control information sending method, including:

sending at least one piece of control information to a device, where the at least one piece of control information carries hybrid automatic repeat request-acknowledgement codebook indication information, and the hybrid automatic repeat request-acknowledgement codebook indication information is used to indicate a hybrid automatic repeat request-acknowledgement codebook size;

receiving the hybrid automatic repeat request-acknowledgement that is sent by the device according to the hybrid automatic repeat request-acknowledgement codebook indication information; and obtaining, according to the hybrid automatic repeat request-acknowledgement, an acknowledgement of each piece of the control information or an acknowledgement of a physical downlink shared channel corresponding to each piece of the control information, where a bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

With reference to the second aspect, in a first possible implementation of the second aspect, the hybrid automatic repeat request-acknowledgement codebook size includes at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

With reference to the second aspect or the first possible implementation of the second aspect, in a second possible implementation of the second aspect, the bit quantity of the hybrid automatic repeat request-acknowledgement codebook indication information is specifically 2 bits, 3 bits, or 4 bits.

With reference to any one of the second aspect or the first and the second possible implementations of the second aspect, in a third possible implementation of the second aspect, the method further includes:

adding a count allocation index to the control information.

According to a third aspect, an embodiment of the present invention provides a control information sending method, including:

determining a hybrid automatic repeat request-acknowledgement codebook size, and generating hybrid automatic repeat request-acknowledgement codebook indication information according to the hybrid automatic repeat request-acknowledgement codebook size; and sending the hybrid automatic repeat request-acknowledgement and the hybrid automatic repeat request-acknowledgement codebook indication information to a device, where a bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

With reference to the third aspect, in a first possible implementation of the third aspect, the bit quantity of the hybrid automatic repeat request-acknowledgement codebook indication information is specifically 2 bits, 3 bits, or 4 bits.

With reference to the third aspect or the first possible implementation of the third aspect, in a second possible implementation of the third aspect, the method further includes:

receiving at least one piece of control information sent by the device, where the control information includes a count allocation index; and generating the hybrid automatic repeat request-acknowledgement according to the count allocation index.

According to a fourth aspect, an embodiment of the present invention provides a control information sending method, including:

receiving a hybrid automatic repeat request-acknowledgement and hybrid automatic repeat request-acknowledgement codebook indication information that are sent by a device;

determining a hybrid automatic repeat request-acknowledgement codebook size according to the hybrid automatic repeat request-acknowledgement codebook indication information; and decoding the hybrid automatic repeat request-acknowledgement according to the hybrid automatic repeat request-acknowledgement codebook size, and obtaining an acknowledgement of each piece of control information or an acknowledgement of a physical shared channel corresponding to each piece of control information, where a bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

With reference to the fourth aspect, in a first possible implementation of the fourth aspect, the bit quantity of the hybrid automatic repeat request-acknowledgement codebook indication information is specifically 2 bits, 3 bits, or 4 bits.

With reference to the fourth aspect or the first possible implementation of the fourth aspect, in a second possible implementation of the fourth aspect, the method further includes:

sending at least one piece of control information to the device, where the control information includes a count allocation index.

With reference to the second possible implementation of the fourth aspect, in a third possible implementation of the fourth aspect, the obtaining an acknowledgement of each piece of control information or an acknowledgement of a physical shared channel corresponding to each piece of control information includes:

determining, according to the count allocation index, the acknowledgement of the control information or the acknowledgement of the physical shared channel corresponding to the control information.

According to a fifth aspect, an embodiment of the present invention provides a communications device, including:

a receiving module, configured to receive at least one piece of control information sent by a sending device, where the at least one piece of control information carries hybrid automatic repeat request-acknowledgement codebook indication information, and the hybrid automatic repeat request-acknowledgement codebook indication information is used to indicate a hybrid automatic repeat request-acknowledgement codebook size;

a processing module, configured to generate the hybrid automatic repeat request-acknowledgement according to the hybrid automatic repeat request-acknowledgement codebook indication information; and a sending module, configured to send the hybrid automatic repeat request-acknowledgement to the sending device, where a bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

With reference to the fifth aspect, in a first possible implementation of the fifth aspect, the hybrid automatic repeat request-acknowledgement codebook size includes at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

With reference to the fifth aspect or the first possible implementation of the fifth aspect, in a second possible implementation of the fifth aspect, the bit quantity of the hybrid automatic repeat request-acknowledgement codebook indication information is specifically 2 bits, 3 bits, or 4 bits.

With reference to any one of the fifth aspect or the first and the second possible implementations of the fifth aspect, in a third possible implementation of the fifth aspect, the control information further carries a count allocation index; and the processing module is configured to generate the hybrid automatic repeat request-acknowledgement according to the hybrid automatic repeat request-acknowledgement codebook indication information, including:

generating the hybrid automatic repeat request-acknowledgement according to the count allocation index of the control information and the hybrid automatic repeat request-acknowledgement codebook size.

With reference to the third possible implementation of the fifth aspect, in a fourth possible implementation of the fifth aspect, the processing module is configured to generate the hybrid automatic repeat request-acknowledgement according to the count allocation index of the control information and the hybrid automatic repeat request-acknowledgement codebook size, including:

determining a count allocation index of lost control information or a count allocation index of a code word according to the count allocation index and the hybrid automatic repeat request-acknowledgement codebook size, and generating the hybrid automatic repeat request-acknowledgement according to the received control information and the count allocation index of the lost control information or the count allocation index of the code word.

According to a sixth aspect, an embodiment of the present invention provides a communications device, including:

a sending module, configured to send at least one piece of control information to a receiving device, where the at least one piece of control information carries hybrid automatic repeat request-acknowledgement codebook indication information, and the hybrid automatic repeat request-acknowledgement codebook indication information is used to indicate a hybrid automatic repeat request-acknowledgement codebook size;

a receiving module, configured to receive the hybrid automatic repeat request-acknowledgement that is sent by the receiving device according to the hybrid automatic repeat request-acknowledgement codebook indication information; and a processing module, configured to obtain, according to the hybrid automatic repeat request-acknowledgement, an acknowledgement of each piece of the control information or an acknowledgement of a physical downlink shared channel corresponding to each piece of the control information, where a bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

With reference to the sixth aspect, in a first possible implementation of the sixth aspect, the hybrid automatic repeat request-acknowledgement codebook size includes at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

With reference to the sixth aspect or the first possible implementation of the sixth aspect, in a second possible implementation of the sixth aspect, the bit quantity of the hybrid automatic repeat request-acknowledgement codebook indication information is specifically 2 bits, 3 bits, or 4 bits.

With reference to any one of the sixth aspect or the first and the second possible implementations of the sixth aspect, in a third possible implementation of the sixth aspect, the processing module is further configured to add a count allocation index to the control information.

According to a seventh aspect, an embodiment of the present invention provides a communications device, including:

a processing module, configured to determine a hybrid automatic repeat request-acknowledgement codebook size, and generate hybrid automatic repeat request-acknowledgement codebook indication information according to the hybrid automatic repeat request-acknowledgement codebook size; and a sending module, configured to send the hybrid automatic repeat request-acknowledgement and the hybrid automatic repeat request-acknowledgement codebook indication information to a sending device, where a bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

With reference to the seventh aspect, in a possible implementation of the seventh aspect, the bit quantity of the hybrid automatic repeat request-acknowledgement codebook indication information is specifically 2 bits, 3 bits, or 4 bits.

With reference to the seventh aspect or the first possible implementation of the seventh aspect, in a second possible implementation of the seventh aspect, the communications device further includes a receiving module, where the receiving module is configured to receive at least one piece of control information sent by the device, where the control information includes a count allocation index; and the processing module is further configured to generate the hybrid automatic repeat request-acknowledgement according to the count allocation index.

According to an eighth aspect, an embodiment of the present invention provides a communications device, including:

a receiving module, configured to receive a hybrid automatic repeat request-acknowledgement and hybrid automatic repeat request-acknowledgement codebook indication information that are sent by a receiving device; and a processing module, configured to determine a hybrid automatic repeat request-acknowledgement codebook size according to the hybrid automatic repeat request-acknowledgement codebook indication information, where the processing module is further configured to: decode the hybrid automatic repeat request-acknowledgement according to the hybrid automatic repeat request-acknowledgement codebook size, and obtain an acknowledgement of each piece of control information or an acknowledgement of a physical shared channel corresponding to each piece of control information; and a bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

With reference to the eighth aspect, in a first possible implementation of the eighth aspect, the bit quantity of the hybrid automatic repeat request-acknowledgement codebook indication information is specifically 2 bits, 3 bits, or 4 bits.

With reference to the eighth aspect or the first possible implementation of the eighth aspect, in a second possible implementation of the eighth aspect, the communications device further includes:

a sending module, configured to send at least one piece of control information to the device, where the control information includes a count allocation index.

With reference to the second possible implementation of the eighth aspect, in a third possible implementation of the eighth aspect, the processing module is configured to obtain an acknowledgement of each piece of control information or an acknowledgement of a physical shared channel corresponding to each piece of control information, including:

determining, according to the count allocation index, the acknowledgement of the control information or the acknowledgement of the physical shared channel corresponding to the control information.

According to the control information sending method and the communications device in the embodiments of the present invention, the at least one piece of control information sent by the device is received, where the at least one piece of control information carries the hybrid automatic repeat request-acknowledgement codebook indication information, and the hybrid automatic repeat request-acknowledgement codebook indication information is used to indicate the hybrid automatic repeat request-acknowledgement codebook size; the hybrid automatic repeat request-acknowledgement is generated according to the hybrid automatic repeat request-acknowledgement codebook indication information; and the hybrid automatic repeat request-acknowledgement is sent to the device. Because the hybrid automatic repeat request-acknowledgement codebook indication information is received, the hybrid automatic repeat request-acknowledgement is generated according to the hybrid automatic repeat request-acknowledgement codebook indication information, so that one device and another device have a consistent understanding of a total original information bit quantity of a hybrid automatic repeat request-acknowledgement that needs to be fed back. Therefore, decoding errors of uplink control information are effectively reduced, and an increase of complexity of blind detection performed by a device can be effectively avoided.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
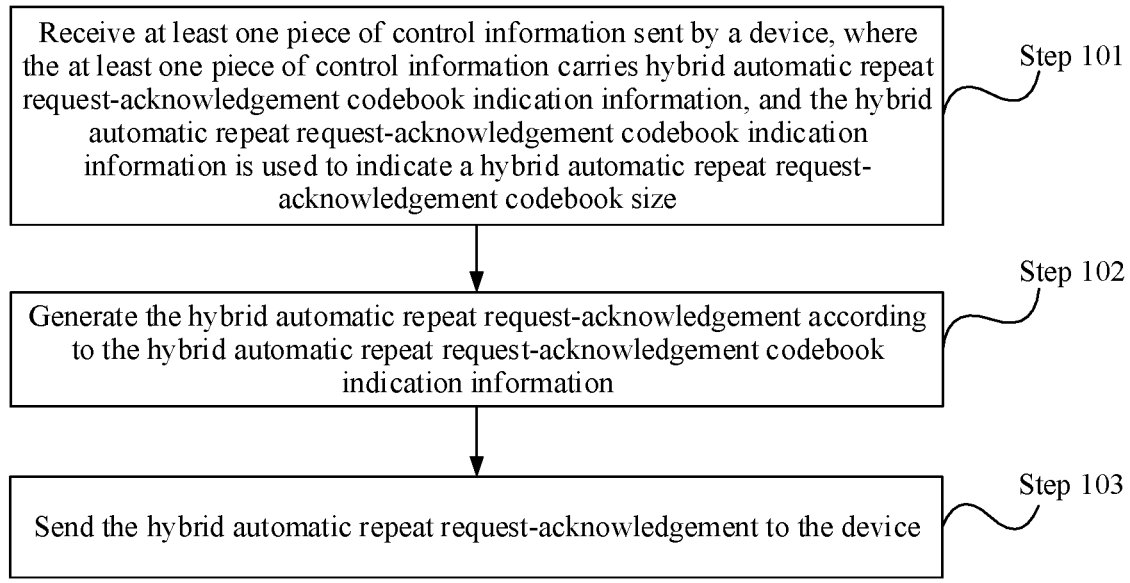
FIG. 1 is a flowchart of Embodiment 1 of a control information sending method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The embodiments of the present invention relate to transmission of control information between devices, specifically, between a base station and user equipment, between user equipments, or between a relay and user equipment. A control information sending method in the embodiments of the present invention is applicable to any one of the foregoing implementation scenarios. The control information sending method in the embodiments of the present invention can effectively resolve the foregoing problem that one device and another device have different understandings of a total original information bit quantity of a hybrid automatic repeat request-acknowledgement, and is mainly based on a carrier aggregation architecture.

A base station and user equipment are used as an example below for description. Specifically, the base station sends downlink control information to the user equipment, and the downlink control information may carry scheduling information. The user equipment performs data receiving or sending processing according to the scheduling information, and sends a feedback processing result to the base station by using a PUCCH. In a current LTE technology, for FDD, after receiving a PDSCH in a subframe n−4, UE feeds back a HARQ-ACK in a subframe n. For TDD, a time sequence relationship between receiving of a PDSCH and a feedback of a HARQ-ACK corresponding to the PDSCH is shown in Table 1. A subframe marked with a number is an uplink subframe n used to feed back a HARQ-ACK. The number K represents that a HARQ-ACK corresponding to a PDSCH in a downlink subframe set n−k (k belongs to K) needs to be fed back in the uplink subframe n. For example, K={7, 6} in a subframe n=2 of an uplink and downlink configuration 1 represents that the uplink subframe n=2 is used to feed back HARQ-ACKs corresponding to PDSCHs in two downlink subframes n−7 and n−6. Specifically, n−7 is a downlink subframe 5, and n−6 is a downlink subframe 4. With further evolution of the LTE technology, a scenario in which aggregation of 32 carriers are supported is being considered in the LTE Release 13 (Release 13, R13 for short). For example, in TDD carrier aggregation, a primary carrier has a TDD uplink and downlink configuration 2, four secondary carriers all have an uplink and downlink configuration 5, and each carrier is configured in such a manner that a transmission mode of two code words (code word) is supported and a spatial bundling manner is not supported. For specific different TDD uplink and downlink configurations, refer to Table 2. A maximum quantity of HARQ-ACKs that need to be fed back in one uplink subframe of user equipment is 2*(4+9*4)=80 bits. In a TDD-FDD carrier aggregation scenario, a TDD carrier is a primary carrier, a configuration is a TDD configuration 5, other carriers are all FDD carriers, and each carrier is configured in such a manner that a transmission mode of two code words is supported and a spatial bundling mode is not used. A maximum quantity of HARQ-ACKs that need to be fed back in one uplink subframe of one uplink primary carrier is 2*(9+10*31)=638 bits. If each carrier is configured in such a manner that a transmission mode of one code word is supported or each carrier is configured in such a manner that the transmission mode of two code words is supported and the spatial bundling mode (bundling) is used, a maximum quantity of HARQ-ACKs that need to be fed back in one uplink subframe of one uplink primary carrier is 1*(9+10*31)=319 bits. It should be noted that the spatial bundling mode (bundling) specifically means that a logical AND operation is performed on two HARQ-ACKs respectively corresponding to two spatial code words to generate one HARQ-ACK of one bit in an uplink subframe. The HARQ-ACK has at least two states: a NACK and an ACK. For example, 0 represents the NACK, and 1 represents the ACK. When the logical AND operation results in only one NACK, a result of logical AND is the NACK. The result of the logical AND is the ACK only when all are ACKs.

In a TDD carrier aggregation scenario, another typical configuration is 32 carriers. Each carrier has an uplink and downlink configuration 2. If each carrier is configured in such a manner that the transmission mode of two code words is supported and the spatial bundling mode is not used, the maximum quantity of HARQ-ACKs that need to be fed back in one uplink subframe of one uplink primary carrier is 2*4*32=256 bits. If each carrier is configured in such a manner that the transmission mode of two code words is supported and the spatial bundling mode is used, or each carrier is configured in such a manner that the transmission mode of one code word is supported, the maximum quantity of HARQ-ACKs that need to be fed back in one uplink subframe of one uplink primary carrier is 1*4*32=128 bits.

Based on the foregoing examples, if the total original information bit quantity of HARQ-ACK joint coding is calculated based on the quantity of PDSCHs on a downlink carrier that are detected by the UE, once a PDSCH on a downlink carrier is missed during detection, a quantity of carriers having PDSCHs that is understood by the UE is less than a quantity of carriers of PDSCHs actually sent by an eNB. However, the eNB does not know whether the UE has missed a PDSCH during detection, and how many PDSCHs are missed during detection. Therefore, the UE and the eNB have inconsistent understandings of the total original information bit quantity of the HARQ-ACK joint coding of multiple downlink carriers. Consequently, a fed back HARQ-ACK cannot be correctly decoded. Therefore, a problem that user equipment and a base station device have inconsistent understandings of a total original information bit quantity (a codebook size of a HARQ-ARQ) of a HARQ-ACK of multiple downlink carriers urgently needs to be resolved. In the present invention, the foregoing problem can be effectively resolved by using a control information sending method in the following embodiments. For specific implementations, refer to detailed descriptions in the following embodiments.

TABLE 1

Time sequence relationship between PDSCHs and ACKs/NACKs corresponding to the PDSCHs in a TDD system

| Uplink and downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 2

Different TDD uplink and downlink configurations in an LTE system

| Uplink and downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1 is a flowchart of Embodiment 1 of a control information sending method according to the present invention. This embodiment is executed by a device. The device may be user equipment. As shown in FIG. 1, the method in this embodiment may include the following steps.

Step 101. Receive at least one piece of control information sent by the device, where the at least one piece of control information carries hybrid automatic repeat request-acknowledgement codebook indication information, and the hybrid automatic repeat request-acknowledgement codebook indication information is used to indicate a hybrid automatic repeat request-acknowledgement codebook size.

Specifically, step 101 may be that the device receives at least one piece of control information sent by another device. Specifically, user equipment and a base station are used as an example for description, that is, this embodiment is executed by the user equipment. The user equipment receives at least one piece of downlink control information (DCI) sent by the base station. At least one piece of the at least one piece of downlink control information DCI carries the hybrid automatic repeat request-acknowledgement HARQ-ACK codebook indication information.

Step 102. Generate the hybrid automatic repeat request-acknowledgement according to the hybrid automatic repeat request-acknowledgement codebook indication information.

Specifically, the user equipment receives the hybrid automatic repeat request-acknowledgement codebook indication information sent by the base station, and may learn a hybrid automatic repeat request-acknowledgement codebook size. The user equipment generates the hybrid automatic repeat request-acknowledgement according to the hybrid automatic repeat request-acknowledgement codebook size.

Step 103. Send the hybrid automatic repeat request-acknowledgement to the device.

Specifically, the user equipment may map the generated hybrid automatic repeat request-acknowledgement to an uplink channel after performing code modulation on the generated hybrid automatic repeat request-acknowledgement, and send the generated hybrid automatic repeat request-acknowledgement to the base station.

A bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

It may be understood that in an implementable manner, the user equipment receives the hybrid automatic repeat request-acknowledgement codebook indication information sent by the base station. The hybrid automatic repeat request-acknowledgement codebook indication information may be in one of $2^N$ states. A difference between hybrid automatic repeat request-acknowledgement codebook sizes corresponding to the hybrid automatic repeat request-acknowledgement codebook indication information is at least $2^N+1$. The user equipment needs to obtain only a set of hybrid automatic repeat request-acknowledgement codebook sizes corresponding to the hybrid automatic repeat request-acknowledgement codebook indication information in this state, and may determine the hybrid automatic repeat request-acknowledgement codebook size according to the received downlink control information and the set of hybrid automatic repeat request-acknowledgement codebook sizes.

Certainly, it may be understood that in another implementable manner, the bit quantity of the hybrid automatic repeat request-acknowledgement codebook indication information is N, and the quantity of states of the hybrid automatic repeat request-acknowledgement codebook indication information is $2^N$. A difference between hybrid automatic repeat request-acknowledgement codebook sizes corresponding to each state is set to at least $2^N+1$, and N is a natural number greater than or equal to 2. The user equipment receives the hybrid automatic repeat request-acknowledgement codebook indication information sent by the base station, and obtains, in the set of hybrid automatic repeat request-acknowledgements codebook sizes corresponding to the states, a state corresponding to the hybrid automatic repeat request-acknowledgement codebook indication information, further obtains a set of hybrid automatic repeat request-acknowledgement codebook sizes corresponding to the hybrid automatic repeat request-acknowledgement codebook indication information in this state, and may determine the hybrid automatic repeat request-acknowledgement codebook size according to the received downlink control information and the set of hybrid automatic repeat request-acknowledgement codebook sizes.

For a clear understanding of this embodiment, an example in which the hybrid automatic repeat request-acknowledgement codebook indication information is 2 bits is used for description. A correspondence between states of the hybrid automatic repeat request-acknowledgement codebook indication information and hybrid automatic repeat request-acknowledgement codebook sizes may be obtained according to a quantity of states of the hybrid automatic repeat request-acknowledgement codebook indication information, and a difference relationship between hybrid automatic repeat request-acknowledgement codebook sizes corresponding to the states, as shown in Table 3 or Table 4. As shown in Table 3, when the codebook size of a HARQ-ACK that a base station requires user equipment to feed back is 8, the base station obtains, according to Table 3, HARQ-ACK codebook indication information 11 corresponding to 8, and sends the HARQ-ACK codebook indication information 11 to the user equipment. The user equipment obtains the HARQ-ACK codebook indication information, and may learn, according to Table 3, that the codebook size of the HARQ-ACK is 2, 10, 18, or 26. If the user equipment receives 5 pieces of DCI, the user equipment may determine that the codebook size of the HARQ-ACK indicated by the base station is 10, that is, there are 5 pieces of DCI missed during detection. By means of the foregoing method, the base station and the user equipment may have a consistent understanding of a total bit quantity of a HARQ-ACK that needs to be fed back by the user equipment.

TABLE 3

Example 1 of a correspondence between states of 2-bit HARQ-ACK codebook indication information and codebook sizes of a HARQ-ACK

| HARQ-ACK codebook indication information | Codebook size of a HARQ-ACK |
| --- | --- |
| 0, 0 | 2, 10, 18, or 26 |
| 0, 1 | 4, 12, 20, or 28 |
| 1, 0 | 6, 14, 22, or 30 |
| 1, 1 | 8, 16, 24, or 32 |

TABLE 4

Example 2 of a correspondence between states of 2-bit HARQ-ACK codebook indication information and codebook sizes of a HARQ-ACK

| HARQ-ACK codebook indication information | Codebook size of a HARQ-ACK |
| --- | --- |
| 0, 0 | 1, 9, 17, or 25 |
| 0, 1 | 3, 11, 19, or 27 |
| 1, 0 | 5, 13, 21, or 29 |
| 1, 1 | 7, 15, 23, or 31 |

Certainly, it should be noted that the present invention is not limited to a case in which there are 32 PDSCHs. That is, a maximum value of the codebook size of the HARQ-ACK in Table 3 and Table 4 may be greater than 32, for example, may be 256 or 319, provided that the correspondence between the HARQ-ACK codebook indication information and the codebook sizes of the HARQ-ACK is satisfied and a relationship between the codebook sizes of the HARQ-ACK in the states of the HARQ-ACK codebook indication information is satisfied. In addition, a storage manner for the correspondence between the HARQ-ACK codebook indication information and the codebook quantities of the HARQ-ACK may be another storage manner, and is not limited to a table form herein.

Further, the hybrid automatic repeat request-acknowledgement codebook size may specifically include at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release. That is, the hybrid automatic repeat request-acknowledgement codebook size is a sum of at least one of the foregoing quantities.

Correspondingly, for the application scenario of the base station and the user equipment, the hybrid automatic repeat request-acknowledgement codebook size may specifically include at least one of a quantity of the downlink control information DCI or a quantity of physical downlink shared channels PDSCHs corresponding to the downlink control information DCI, a quantity of code words of a physical downlink shared channel PDSCH corresponding to the downlink control information DCI, a quantity of physical downlink control channels of a downlink semi-persistent scheduling release, or a quantity of code words of a physical downlink control channel of a downlink semi-persistent scheduling release.

Further, the bit quantity of the hybrid automatic repeat request-acknowledgement codebook indication information is specifically 2 bits, 3 bits, or 4 bits. Such a setting can effectively reduce resource overheads required for information transmission.

In this embodiment, the at least one piece of control information sent by the device is received, where the at least one piece of control information carries the hybrid automatic repeat request-acknowledgement codebook indication information, and the hybrid automatic repeat request-acknowledgement codebook indication information is used to indicate the hybrid automatic repeat request-acknowledgement codebook size; the hybrid automatic repeat request-acknowledgement is generated according to the hybrid automatic repeat request-acknowledgement codebook indication information; and the hybrid automatic repeat request-acknowledgement is sent to the device. Because the hybrid automatic repeat request-acknowledgement codebook indication information is received, the hybrid automatic repeat request-acknowledgement is generated according to the hybrid automatic repeat request-acknowledgement codebook indication information, so that one device and another device have a consistent understanding of a total original information bit quantity of a hybrid automatic repeat request-acknowledgement that needs to be fed back. Therefore, decoding errors of uplink control information are effectively reduced, and an increase of complexity of blind detection performed by a device can be effectively avoided.

In the following embodiment, the application scenario of the base station and the user equipment is used as an example for description. However, as described above, the present invention is not limited thereto.

Figure 2:
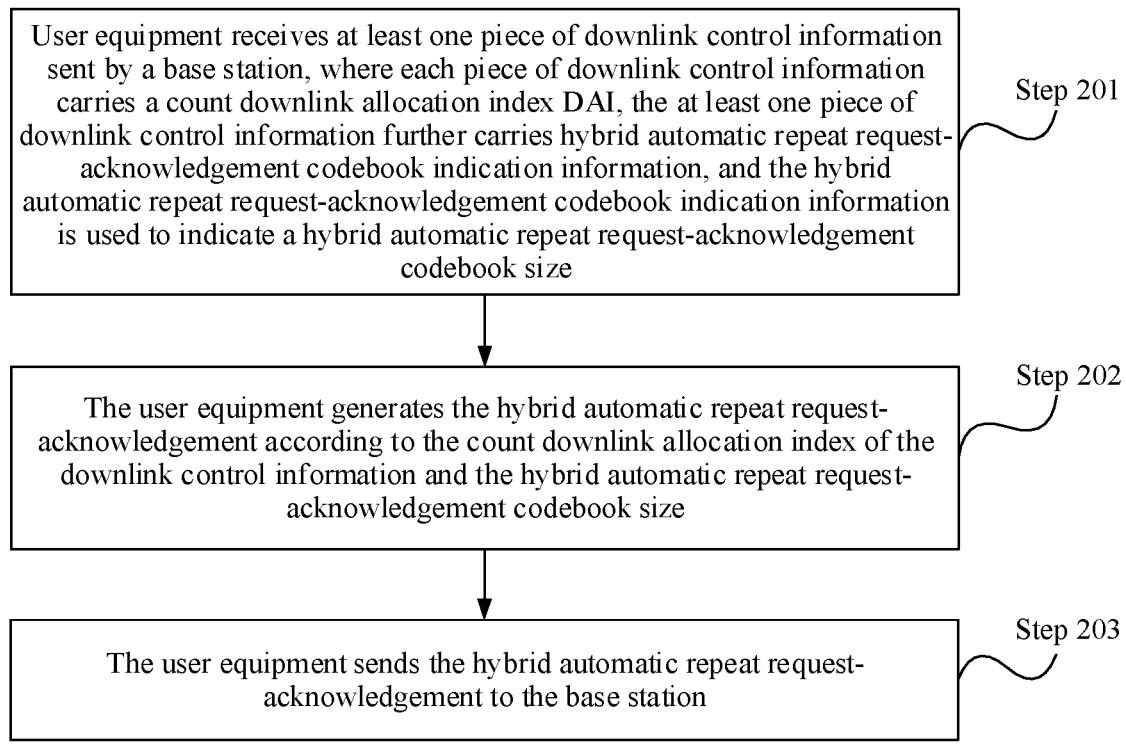
FIG. 2 is a flowchart of Embodiment 2 of a control information sending method according to the present invention.

FIG. 2 is a flowchart of Embodiment 2 of a control information sending method according to the present invention. A difference between this embodiment of the present invention and the embodiment shown in FIG. 1 is that each piece of control information further carries a count allocation index. An implementation scenario of user equipment and a base station is used as an example. Correspondingly, the control information is downlink control information, and the count allocation index is a count downlink allocation index (count DAI). As shown in FIG. 2, the method in this embodiment may include the following steps:

Step 201. The user equipment receives at least one piece of downlink control information sent by the base station, where each piece of the downlink control information carries a count downlink allocation index DAI, the at least one piece of downlink control information further carries hybrid automatic repeat request-acknowledgement codebook indication information, and the hybrid automatic repeat request-acknowledgement codebook indication information is used to indicate a hybrid automatic repeat request-acknowledgement codebook size.

Step 202. The user equipment generates the hybrid automatic repeat request-acknowledgement according to the count downlink allocation index of the downlink control information and the hybrid automatic repeat request-acknowledgement codebook size.

Step 203. The user equipment sends the hybrid automatic repeat request-acknowledgement to the base station.

Specifically, based on the embodiment shown in FIG. 1, in this embodiment, the downlink control information carries the count downlink allocation index, and the count downlink allocation index is used to indicate an index of a physical downlink shared channel corresponding to the downlink control information carrying the count DAI or an index of a code word, or is used to indicate an index of a physical downlink control channel of a downlink semi-persistent scheduling release, or is used to indicate an index of a physical downlink shared channel corresponding to the downlink control information carrying the count downlink allocation index and an index of a physical downlink control channel of a downlink semi-persistent scheduling release. The user equipment may generate the hybrid automatic repeat request-acknowledgement according to the count downlink allocation index of the downlink control information and the hybrid automatic repeat request-acknowledgement codebook size. For example, the base station obtains that the hybrid automatic repeat request-acknowledgement codebook size that needs to be fed back by the user equipment is 8. According to Table 3, the hybrid automatic repeat request-acknowledgement codebook indication information sent to the user equipment is 11, and count downlink allocation indexes of the downlink control information sent by the base station to the user equipment are respectively 1, 2, 3, 4, 5, 6, 7, and 8. However, the user equipment receives only the downlink control information whose count downlink allocation indexes are 1, 2, 3, and 4, but the user equipment receives the hybrid automatic repeat request-acknowledgement codebook indication information 11. In this case, the user equipment may learn, from Table 3 according to the hybrid automatic repeat request-acknowledgement codebook indication information 11 and the four pieces of received downlink control information, that the hybrid automatic repeat request-acknowledgement codebook size sent by the base station is 8, further, may determine, according to the count downlink allocation indexes 1, 2, 3, and 4, that the following four pieces of successive downlink control information are missed during detection, and further generate the hybrid automatic repeat request-acknowledgement. Herein, it is assumed that all the received downlink control information is correctly decoded, and the generated hybrid automatic repeat request-acknowledgement should be 11110000. The hybrid automatic repeat request-acknowledgement obtained after code modulation is mapped to an uplink channel, and is sent to the base station, so that the base station and the user equipment have a consistent understanding of a hybrid automatic repeat request-acknowledgement codebook size.

Further, in step 202, that the user equipment generates the hybrid automatic repeat request-acknowledgement according to the count downlink allocation index of the downlink control information and the hybrid automatic repeat request-acknowledgement codebook size may be specifically: The user equipment determines a count downlink allocation index of lost downlink control information and a count downlink allocation index of a code word according to the count downlink allocation index and the hybrid automatic repeat request-acknowledgement codebook size, and generates the hybrid automatic repeat request-acknowledgement according to the received downlink control information and the count downlink allocation index of the lost downlink control information or the count downlink allocation index of the code word.

Specifically, for example, the base station obtains that the hybrid automatic repeat request-acknowledgement codebook size that needs to be fed back by the user equipment is 8. According to Table 3, the hybrid automatic repeat request-acknowledgement codebook indication information sent to the user equipment is 11, and the count downlink allocation indexes of the downlink control information sent by the base station to the user equipment are respectively 1, 2, 3, 4, 5, 6, 7, and 8. However, the user equipment receives only the downlink control information whose count downlink allocation indexes are 1, 3, 5, and 7, but the user equipment receives the hybrid automatic repeat request-acknowledgement codebook indication information 11. In this case, the user equipment may learn, from Table 3 according to the hybrid automatic repeat request-acknowledgement codebook indication information 11 and the four pieces of received downlink control information, that the hybrid automatic repeat request-acknowledgement codebook size sent by the base station is 8, further, may determine, according to the count downlink allocation indexes 1, 3, 5, and 7, that the downlink control information whose count downlink allocation indexes are 2, 4, 6, and 8 are missed during detection, and further generate the hybrid automatic repeat request-acknowledgement. Herein, it is assumed that all the received downlink control information is correctly decoded, and the generated hybrid automatic repeat request-acknowledgement should be 10101010. The hybrid automatic repeat request-acknowledgement obtained after code modulation is mapped to the uplink channel, and is sent to the base station, so that the base station and the user equipment have a consistent understanding of the hybrid automatic repeat request-acknowledgement codebook size.

Figure 3:
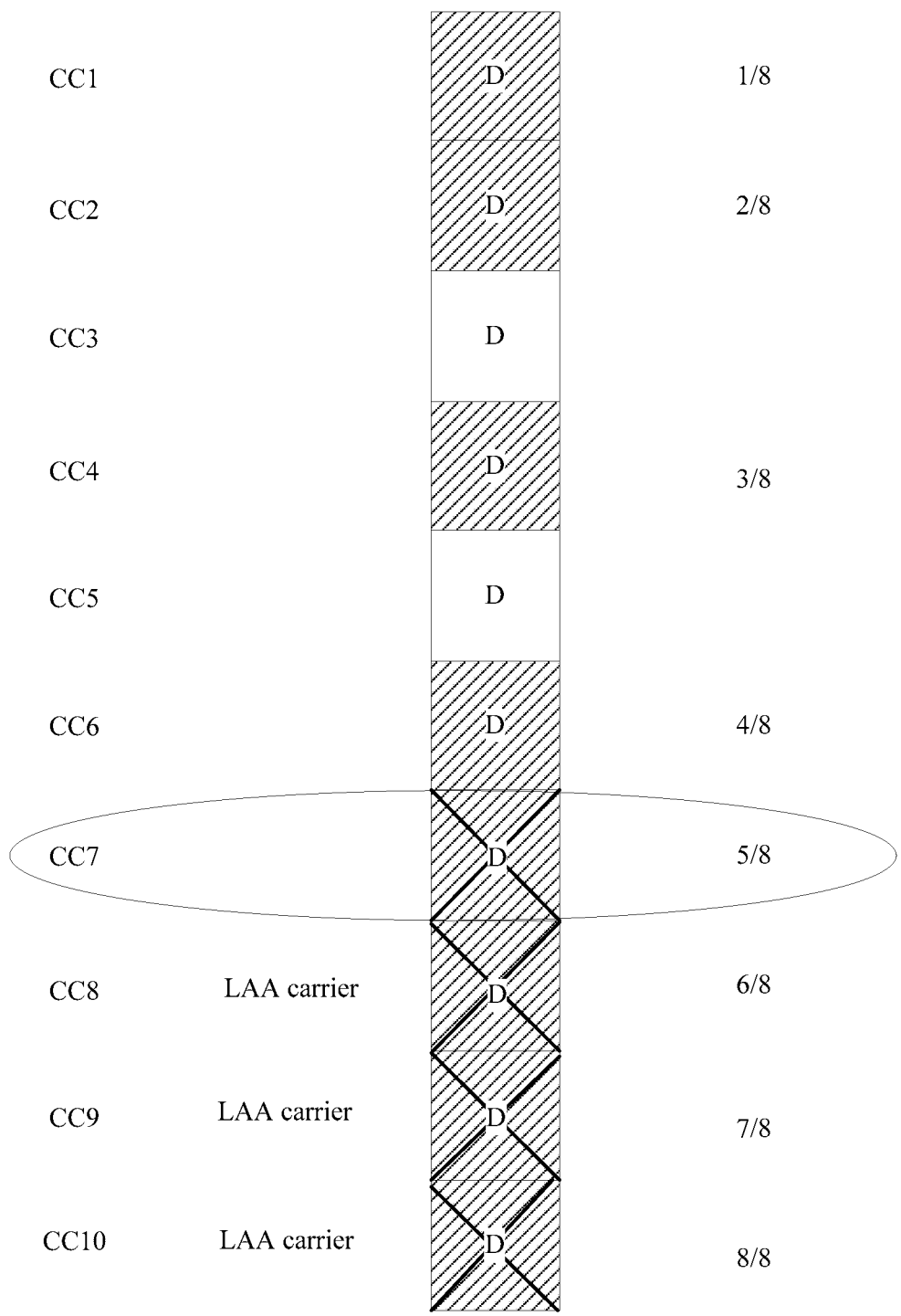
FIG. 3 is a diagram of an implementation example of a control information sending method according to the present invention.

FIG. 3 is a diagram of an implementation example of a control information sending method according to the present invention. The method in this embodiment of the present invention can effectively resolve a problem that a probability that user equipment loses DCI of four carriers one after another increases due to existence of a licensed-assisted access (LAA for short) carrier and in this high-probability case, the UE and an eNB have inconsistent understandings of a codebook size of a HARQ-ACK. Specifically, in consideration of particularity of the LAA carrier, a start location of initial transmission of the LAA carrier may be a middle location of a subframe. The base station eNB needs to encapsulate the DCI and a corresponding data packet in advance. The HARQ-ACK codebook indication information always needs to count in advance a quantity of LAA carriers that may be scheduled, but a resource of the LAA carrier may not be seized eventually. Therefore, a case in which the HARQ-ACK codebook indication information already indicates that the LAA carrier is scheduled, but actually, the eNB has not sent corresponding DCI and a corresponding data channel PDSCH occurs. As a result, the probability that DCI of four carriers is lost one after another increases. In this high-probability case, a problem that the UE and the eNB have inconsistent understandings of the codebook size of the HARQ-ACK exists. For example, as shown in FIG. 3, a hatched CC represents that the CC is scheduled by the eNB. For "1/8" in FIG. 3, "1" before "/" represents a count downlink allocation index, and the number "8" after "/" represents a codebook size of a HARQ-ACK that needs to be fed back by the user equipment, that is, the HARQ-ACK codebook indication information. The count downlink allocation index and the codebook size of the HARQ-ACK shown in FIG. 3 are both actual values. Specifically, the values may be sent in another form, for example, a manner of a binary number or a modular operation. FIG. 3 is merely an example for explaining the method in this embodiment of the present invention. As shown in FIG. 3, CC7 is a non-LAA carrier, but DCI of the CC7 is lost. CC8, CC9, and CC10 are all LAA carriers, and none has seized a resource, that is, no corresponding PDSCH has been sent to the UE. However, by means of the foregoing method in this embodiment of the present invention, the HARQ-ACK codebook indication information received by the user equipment is 11, and the DCI whose count downlink allocation indexes are 1, 2, 3, and 4 is received. Therefore, according to Table 3, the user equipment may learn that the codebook size of HARQ-ACK is 8, and therefore, determine that there are four pieces of DCI missed during detection, so that the UE and the eNB have a consistent understanding of the codebook size of the HARQ-ACK.

Further, it should be noted that a process in which the user equipment generates the hybrid automatic repeat request-acknowledgement according to the count downlink allocation index in the DCI and the hybrid automatic repeat message codebook indication information may be implemented in multiple different manners. For example, alternatively, the user equipment may sort HARQ-ACKs according to the count DAI in the DCI and the HARQ-ACK codebook indication information, or may sort HARQ-ACKs only according to the count DAI. It is specifically noted that, preferably, in a positive sequence, a smaller value (an accumulated quantity) corresponding to the count DAI ranks ahead; or in a negative sequence, a larger value (an accumulated quantity) corresponding to the count DAI ranks ahead. It should be noted that if a PDSCH has no corresponding PDCCH, for example, during SPS transmission, there is no corresponding DAI, the PDSCH may be put ahead of all HARQ-ACKs. Similarly, a value corresponding to the DAI is 0 (in a case of the positive sequence). Specifically, the user equipment may determine, according to the count DAI and the codebook size of the HARQ-ACK, whether there is a PDCCH missed during detection. For example, it is assumed that a user receives five pieces of DCI, values of count DAIS in the DCI are respectively 1, 3, 4, 6, and 7, and the codebook size of the received HARQ-ACK is 8. The user equipment can learn that the second DCI is missed during detection, the fifth DCI is missed during detection, and the eighth DCI is missed during detection. A HARQ-ACK corresponding to the PDCCH missed during detection is a NACK. Five pieces of DCI have been received, and a corresponding HARQ-ACK is generated according to whether a PDSCH corresponding to each piece of DCI is correctly received. That is, if the PDSCH is correctly decoded, the HARQ-ACK is an ACK, and this is indicated by using binary 1. If the PDSCH incorrectly decoded, the HARQ-ACK is a NACK, and this is indicated by using binary 0. It is assumed that the PDSCHs corresponding to the five pieces of DCI are all correctly decoded, the generated HARQ-ACK is 1 0 1 1 0 1 1 0 0. As can be learned from the foregoing example process, that several last data packets are missed during detection or a PDCCH indicating an SPS release is missed during detection may be determined by using the codebook size of the HARQ-ACK, and it may be determined, according to the value of the count DAI, that a middle PDCCH is missed during detection. The last packets missed during detection focus on a quantity of PDCCHs that are specifically missed during detection. All are NACKs, and a sequence does not matter. Therefore, sorting is mainly performed for count DAIS.

In this embodiment, the at least one piece of downlink control information sent by the device is received, where each piece of the downlink control information carries the count downlink allocation index, the at least one piece of downlink control information carries the hybrid automatic repeat request-acknowledgement codebook indication information, and the hybrid automatic repeat request-acknowledgement codebook indication information is used to indicate the hybrid automatic repeat request-acknowledgement codebook size; the hybrid automatic repeat request-acknowledgement is generated according to the count downlink allocation index of the downlink control information and the hybrid automatic repeat request-acknowledgement codebook indication information; and the hybrid automatic repeat request-acknowledgement is sent to the device. Because the hybrid automatic repeat request-acknowledgement codebook indication information and the count downlink allocation index of the downlink control information are received, the hybrid automatic repeat request-acknowledgement is generated according to the hybrid automatic repeat request-acknowledgement codebook indication information and the count downlink allocation index, so that one device and another device have a consistent understanding of a total original information bit quantity of a hybrid automatic repeat request-acknowledgement that needs to be fed back, while proper control information overheads are ensured. Therefore, decoding errors of uplink control information are effectively reduced, and an increase of complexity of blind detection performed by a device can be effectively avoided.

Figure 4:
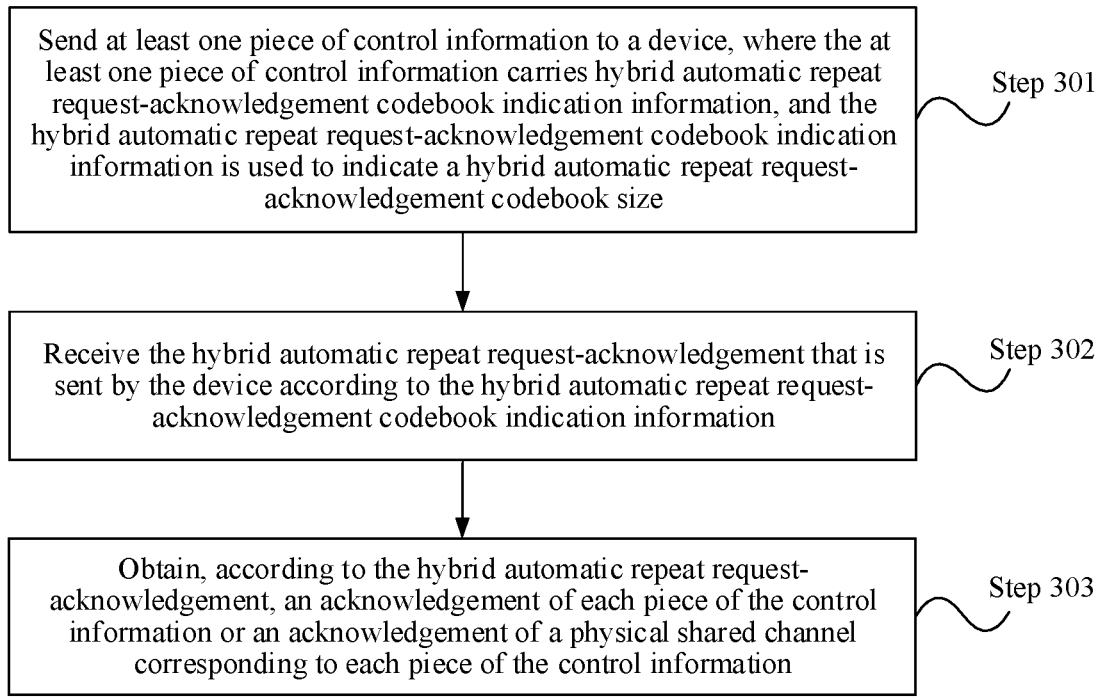
FIG. 4 is a flowchart of Embodiment 3 of a control information sending method according to the present invention.

FIG. 4 is a flowchart of Embodiment 3 of a control information sending method according to the present invention. This embodiment is an embodiment on a base station side and corresponding to the embodiment shown in FIG. 1 or FIG. 2. Certainly, it may be understood that this embodiment may alternatively be an embodiment on a relay side. As shown in FIG. 4, the method in this embodiment may include the following steps:

Step 301. Send at least one piece of control information to a device, where the at least one piece of control information carries hybrid automatic repeat request-acknowledgement codebook indication information, and the hybrid automatic repeat request-acknowledgement codebook indication information is used to indicate a hybrid automatic repeat request-acknowledgement codebook size.

Specifically, a base station may send at least one piece of downlink control information to user equipment, and the at least one piece of downlink control information carries hybrid automatic repeat request-acknowledgement codebook indication information.

Step 302. Receive the hybrid automatic repeat request-acknowledgement that is sent by the device according to the hybrid automatic repeat request-acknowledgement codebook indication information.

Specifically, the base station may receive a hybrid automatic repeat request-acknowledgement that is sent by the user equipment according to the hybrid automatic repeat request-acknowledgement codebook indication information.

Step 303. Obtain, according to the hybrid automatic repeat request-acknowledgement, an acknowledgement of each piece of the control information or an acknowledgement of a physical shared channel corresponding to each piece of the control information.

Specifically, the base station may obtain, according to the hybrid automatic repeat request-acknowledgement, an acknowledgement of each piece of the downlink control information or an acknowledgement of a physical downlink shared channel corresponding to each piece of the downlink control information. That is, the base station receives the hybrid automatic repeat request-acknowledgement that is sent by the user equipment on an uplink channel, decodes the hybrid automatic repeat request-acknowledgement according to the hybrid automatic repeat request-acknowledgement codebook size, and obtains the acknowledgement of the downlink control information or the acknowledgement of the physical downlink shared channel corresponding to the downlink control information.

A bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

Further, the hybrid automatic repeat request-acknowledgement codebook size includes at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

Further, the bit quantity of the hybrid automatic repeat request-acknowledgement codebook indication information is specifically 2 bits, 3 bits, or 4 bits.

Further, the foregoing method may further include: obtaining a count allocation index of the control information, and adding the count allocation index to the control information.

Specifically, the base station may obtain by means of calculation a count downlink allocation index of the downlink control information according to the downlink control information or a quantity (an accumulated quantity) of code words of a physical shared channel corresponding to the downlink control information, and add the count downlink allocation index to the downlink control information. A bit quantity of the count downlink allocation index may be 2 bits or 3 bits. A correspondence between count downlink allocation indexes and count downlink allocation index indication information whose bit quantity is 2 bits is shown in Table 5 below and a correspondence between count downlink allocation indexes and count downlink allocation index indication information whose bit quantity is 3 bits is shown in Table 6 below. That is, after obtaining the downlink control information or the quantity (the accumulated quantity) of code words of the physical shared channel corresponding to the downlink control information, the base station generates count DAI indication information according to Table 5 or Table 6, and sends the count DAI indication information to the user equipment. The user equipment may obtain a corresponding count downlink allocation index according to Table 5 or Table 6 and the count DAI indication information.

TABLE 5

Correspondence between 2-bit count DAI indication information and count downlink allocation indexes

| Count DAI indication information | Count downlink allocation index |
| --- | --- |
| 0, 0 | 1, 5, 9, 13, 17, 21, 25, or 29 |
| 0, 1 | 2, 6, 10, 14, 18, 22, 26, or 30 |
| 1, 0 | 3, 7, 11, 15, 19, 23, 27, or 31 |
| 1, 1 | 4, 8, 12, 16, 20, 24, 28, or 32 |

TABLE 6

Correspondence between 3-bit count DAI indication
information and count downlink allocation indexes

| Count DAI indication information | Count downlink allocation index |
| --- | --- |
| 000 | 1, 9, 17, or 25 |
| 001 | 2, 10, 18, or 26 |
| 010 | 3, 11, 19, or 27 |
| 011 | 4, 12, 20, or 28 |
| 100 | 5, 13, 21, or 29 |
| 101 | 6, 14, 22, or 30 |
| 110 | 7, 15, 23, or 31 |
| 111 | 8, 16, 24, or 32 |

Further, the base station may add the count downlink allocation index to the at least one piece of downlink control information DCI, and the count DAI is used to indicate at least one of the following indexes: an index of a PDSCH corresponding to the downlink control information DCI, an index of a code word of a PDSCH corresponding to the downlink control information DCI, or an index of a PDCCH/EPDCCH of a downlink semi-persistent scheduling (SPS) release. A sequence of corresponding ACKs/NACKs is determined according to the count DAI in the DCI and the HARQ-ACK codebook indication information, and each PDSCH, a code word of the PDSCH, or ACK/NACK information indicating a PDCCH of an SPS release is determined. For example, if the codebook size of the HARQ-ACK sent by the base station is 8, and the received HARQ-ACK information obtained after decoding is 1 0 1 1 0 1 1 0, it may be learned that the first, the third, the fourth, the sixth, and the seventh PDSCHs are all correctly received, and other PDCCHs may be missed during detection, or may be incorrectly decoded.

In this embodiment, the at least one piece of control information is sent to the device, where the at least one piece of control information carries the hybrid automatic repeat request-acknowledgement codebook indication information, and the hybrid automatic repeat request-acknowledgement codebook indication information is used to indicate the hybrid automatic repeat request-acknowledgement codebook size; the hybrid automatic repeat request-acknowledgement that is sent by the device according to the hybrid automatic repeat request-acknowledgement codebook indication information is received; and the acknowledgement of each piece of the control information or the acknowledgement of the physical downlink shared channel corresponding to each piece of the control information is obtained according to the hybrid automatic repeat request-acknowledgement, so that one device and another device have a consistent understanding of a total original information bit quantity of a hybrid automatic repeat request-acknowledgement that needs to be fed back. Therefore, decoding errors of uplink control information are effectively reduced, and an increase of complexity of blind detection performed by a device can be effectively avoided.

In the foregoing embodiments, the base station determines the hybrid automatic repeat request-acknowledgement codebook indication information and sends the hybrid automatic repeat request-acknowledgement codebook indication information to the user equipment. Different from the foregoing embodiments, in the following embodiment, a method in which the user equipment determines the HARQ-ACK codebook indication information, and the UE sends the hybrid automatic repeat request-acknowledgement codebook indication information to the base station is described. In the method, the base station and the user equipment can also have a consistent understanding of the hybrid automatic repeat request-acknowledgement codebook size.

Figure 5:
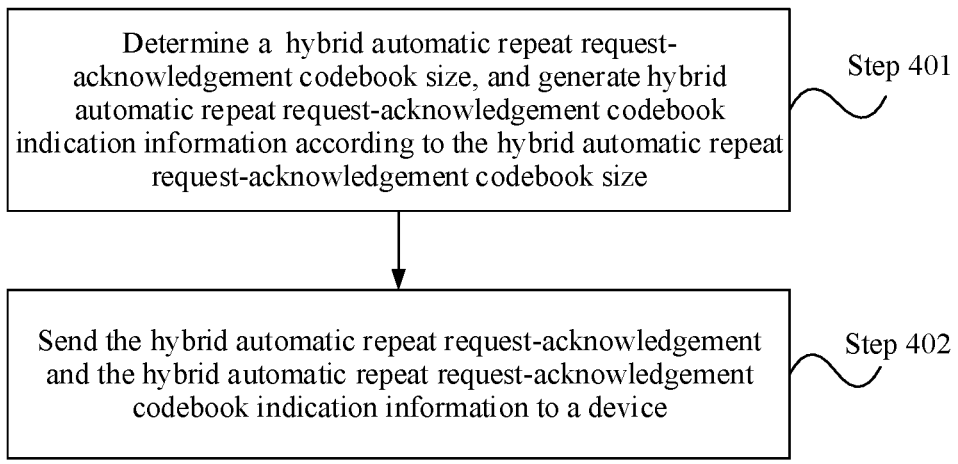
FIG. 5 is a flowchart of Embodiment 4 of a control information sending method according to the present invention.

FIG. 5 is a flowchart of Embodiment 4 of a control information sending method according to the present invention. This embodiment may be executed by user equipment. As shown in FIG. 5, the method in this embodiment may include the following steps:

Step 401. Determine a hybrid automatic repeat request-acknowledgement codebook size, and generate hybrid automatic repeat request-acknowledgement codebook indication information according to the hybrid automatic repeat request-acknowledgement codebook size.

Specifically, the user equipment may determine the hybrid automatic repeat request-acknowledgement codebook size according to the generated hybrid automatic repeat request-acknowledgement, and generate the hybrid automatic repeat request-acknowledgement codebook indication information according to the hybrid automatic repeat request-acknowledgement codebook size.

Step 402. Send the hybrid automatic repeat request-acknowledgement and the hybrid automatic repeat request-acknowledgement codebook indication information to a device.

The user equipment may send the hybrid automatic repeat request-acknowledgement and the hybrid automatic repeat request-acknowledgement codebook indication information to a base station.

A bit quantity of the hybrid automatic repeat request-acknowledgement codebook indication information is N, a quantity of states of the hybrid automatic repeat request-acknowledgement codebook indication information is $2^N$, a difference between hybrid automatic repeat request-acknowledgement codebook sizes corresponding to each state is at least $2^N+1$, and N is a natural number greater than or equal to 2.

Further, the bit quantity of the hybrid automatic repeat request-acknowledgement codebook indication information may be specifically 2 bits, 3 bits, or 4 bits. Specifically, for 2-bit hybrid automatic repeat request-acknowledgement codebook indication information, refer to Table 3 or Table 4.

Further, the method may further include: receiving at least one piece of control information sent by the device, where each piece of the control information includes a count allocation index; and generating the hybrid automatic repeat request-acknowledgement according to the count allocation index of the control information.

That is, the user equipment may further receive at least one piece of downlink control information sent by the base station, and each piece of the downlink control information includes a count downlink allocation index. The user equipment may generate the hybrid automatic repeat request-acknowledgement according to the count allocation index of the downlink control information.

Specifically, the DCI carries the count downlink allocation index. The count DAI is used to indicate at least one of the following: an index of a PDSCH corresponding to the downlink control information DCI, an index of a code word of a PDSCH corresponding to the downlink control information DCI, or an index of a PDCCH/EPDCCH of a downlink semi-persistent scheduling (SPS) release. The user equipment sorts HARQ-ACKs according to the count DAI in the DCI. It is specifically noted that, preferably, in a positive sequence, a smaller value (an accumulated quantity) corresponding to the count DAI ranks ahead; or in a negative sequence, a larger value (an accumulated quantity) corresponding to the count DAI ranks ahead. It should be noted that if a PDSCH has no corresponding PDCCH, for example, during SPS transmission, there is no corresponding DAI, the PDSCH is put ahead of all HARQ-ACKs. Similarly, a value corresponding to the DAI is 0 (in a case of the positive sequence).

Specifically, the user equipment may determine, according to the count DAI, whether there is a PDCCH missed during detection. For example, it is assumed that the user equipment receives five pieces of DCI, and values of count DAIs in the DCI are respectively 1, 3, 4, 6, and 7. The user equipment can determine that the second DCI is missed during detection and the fifth DCI is missed during detection. A HARQ-ACK corresponding to a PDCCH missed during detection is a NACK. Five pieces of DCI have been received, and a corresponding HARQ-ACK is generated according to whether a PDSCH corresponding to each piece of DCI is correctly received. That is, if the PDSCH is correctly decoded, the HARQ-ACK is an ACK, and this is indicated by using binary 1. If the PDSCH incorrectly decoded, the HARQ-ACK is a NACK, and this is indicated by using binary 0. It is assumed that the PDSCHs corresponding to the five pieces of DCI are all correctly decoded, the current HARQ-ACK is 1 0 1 1 0 1 1. As can be learned from the foregoing example process, it may be determined, according to the value of the count DAI, that a middle PDCCH is missed during detection. After the HARQ-ACK information 1 0 1 1 0 1 1 is generated, the user equipment maps the HARQ-ACK information to uplink information after performing code modulation on the HARQ-ACK information, sends the HARQ-ACK information to the base station, and sends the codebook size 5 of the HARQ-ACK to the base station. Specifically, the user equipment may send HARQ-ACK indication information 10 to the base station according to Table 4.

In this embodiment, after the device generates the hybrid automatic repeat request-acknowledgement, the hybrid automatic repeat request-acknowledgement codebook size is determined, the hybrid automatic repeat request-acknowledgement codebook indication information is generated according to the hybrid automatic repeat request-acknowledgement codebook size, and the hybrid automatic repeat request-acknowledgement and the hybrid automatic repeat request-acknowledgement codebook indication information are sent to another device, so that the device and the another device have a consistent understanding of a total original information bit quantity of a hybrid automatic repeat request-acknowledgement that needs to be fed back, and an increase of complexity of blind detection performed by a device can be effectively avoided.

Figure 6:
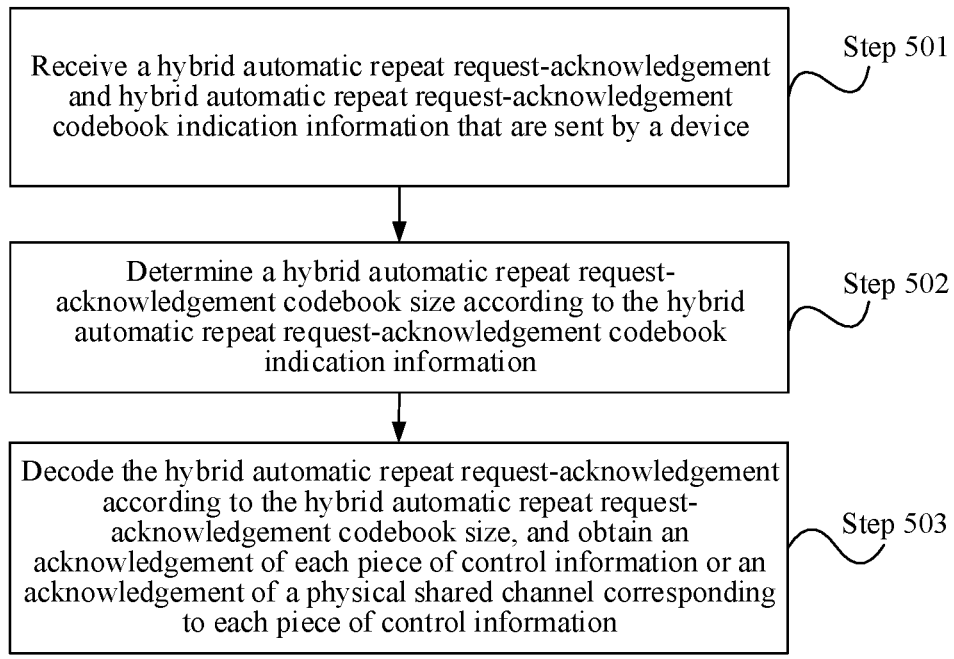
FIG. 6 is a flowchart of Embodiment 5 of a control information sending method according to the present invention.

FIG. 6 is a flowchart of Embodiment 5 of a control information sending method according to the present invention. This embodiment may be executed by a base station. As shown in FIG. 6, the method in this embodiment may include the following steps:

Step 501. Receive a hybrid automatic repeat request-acknowledgement and hybrid automatic repeat request-acknowledgement codebook indication information that are sent by a device.

Specifically, the base station may receive a hybrid automatic repeat request-acknowledgement and hybrid automatic repeat request-acknowledgement codebook indication information that are sent by user equipment.

Step 502. Determine a hybrid automatic repeat request-acknowledgement codebook size according to the hybrid automatic repeat request-acknowledgement codebook indication information.

Specifically, the base station may determine a codebook quantity of the hybrid automatic repeat request-acknowledgement according to the hybrid automatic repeat request-acknowledgement codebook indication information. For details, refer to Table 3 or Table 4.

Step 503. Decode the hybrid automatic repeat request-acknowledgement according to the hybrid automatic repeat request-acknowledgement codebook size, and obtain an acknowledgement of each piece of control information or an acknowledgement of a physical shared channel corresponding to each piece of control information.

Specifically, the base station may decode the hybrid automatic repeat request-acknowledgement according to the hybrid automatic repeat request-acknowledgement codebook size, and obtain an acknowledgement of each piece of downlink control information or an acknowledgement of a physical shared channel corresponding to each piece of downlink control information.

A bit quantity of the hybrid automatic repeat request-acknowledgement codebook indication information is N, a quantity of states of the hybrid automatic repeat request-acknowledgement codebook indication information is $2^N$, a difference between hybrid automatic repeat request-acknowledgement codebook sizes corresponding to each state is at least $2^N+1$, and N is a natural number greater than or equal to 2.

Further, the bit quantity of the hybrid automatic repeat request-acknowledgement codebook indication information is specifically 2 bits, 3 bits, or 4 bits. 2-bit hybrid automatic repeat request-acknowledgement codebook indication information may refer to Table 3 or Table 4.

Further, the method may further include: sending at least one piece of control information to the device, where each piece of the control information includes a count allocation index.

That is, specifically, the base station may send at least one piece of downlink control information to the user equipment, and each piece of the downlink control information includes a count downlink allocation index.

Further, step 503 of obtaining an acknowledgement of each piece of control information or an acknowledgement of a physical shared channel corresponding to each piece of control information may be specifically: determining the acknowledgement of the control information or the acknowledgement of the physical shared channel corresponding to the control information according to the count allocation index.

Specifically, the base station sends the downlink control information DCI carrying the count downlink allocation index to the user equipment, and the count DAI is used to indicate at least one of the following: an index of a PDSCH corresponding to the downlink control information DCI, an index of a code word of a PDSCH corresponding to the downlink control information DCI, or an index of a PDCCH/EPDCCH of a downlink semi-persistent scheduling (SPS) release. The user equipment may sort HARQ-ACKs according to a value of the count DAI in the DCI. It is specifically noted that, preferably, in a positive sequence, a smaller value (an accumulated quantity) corresponding to the count DAI ranks ahead; or in a negative sequence, a larger value (an accumulated quantity) corresponding to the count DAI ranks ahead. It should be noted that if a PDSCH has no corresponding PDCCH, for example, during SPS transmission, there is no corresponding DAI, the PDSCH is put ahead of all HARQ-ACKs. Similarly, the value corresponding to the DAI is 0 (in a case of the positive sequence). The user equipment generates the HARQ-ACK according to the count DAI in the DCI, and sends the HARQ-ACK codebook indication information to the base station. The base station may learn, according to the received HARQ-ACK indication information, whether several pieces of DCI are missed during detection.

In this embodiment, the hybrid automatic repeat request-acknowledgement and the hybrid automatic repeat request-acknowledgement codebook indication information that are sent by the device are received, the hybrid automatic repeat request-acknowledgement codebook size is determined according to the hybrid automatic repeat request-acknowledgement codebook indication information, the hybrid automatic repeat request-acknowledgement is decoded according to the hybrid automatic repeat request-acknowledgement codebook size, and the acknowledgement of each piece of the control information or the acknowledgement of the physical shared channel corresponding to each piece of the control information is obtained, so that the device and another device have a consistent understanding of a total original information bit quantity of a hybrid automatic repeat request-acknowledgement that needs to be fed back, and an increase of complexity of blind detection performed by a device can be effectively avoided.

Figure 7:
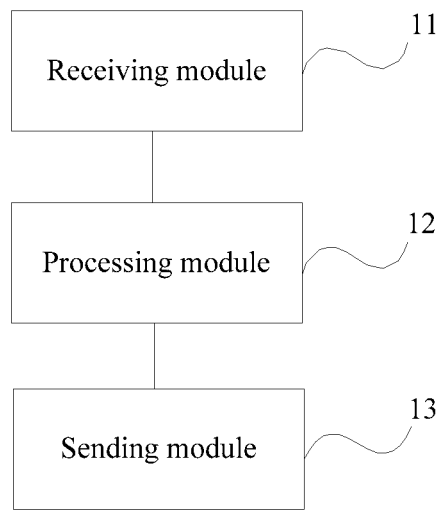
FIG. 7 is a schematic structural diagram of Embodiment 1 of a communications device according to the present invention.

FIG. 7 is a schematic structural diagram of Embodiment 1 of a communications device according to the present invention. As shown in FIG. 7, the communications device in this embodiment may include: a receiving module 11, a processing module 12, and a sending module 13. The receiving module 11 is configured to receive at least one piece of control information sent by a sending device. The at least one piece of control information carries hybrid automatic repeat request-acknowledgement codebook indication information, and the hybrid automatic repeat request-acknowledgement codebook indication information is used to indicate a hybrid automatic repeat request-acknowledgement codebook size. The processing module 12 is configured to generate the hybrid automatic repeat request-acknowledgement according to the hybrid automatic repeat request-acknowledgement codebook indication information. The sending module 13 is configured to send the hybrid automatic repeat request-acknowledgement to the sending device. A bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

Further, the hybrid automatic repeat request-acknowledgement codebook size includes at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

Further, the bit quantity of the hybrid automatic repeat request-acknowledgement codebook indication information is specifically 2 bits, 3 bits, or 4 bits.

The communications device in this embodiment may be specifically a receiving device, for example, user equipment in interaction between a base station and the user equipment, or user equipment in interaction between a relay and the user equipment, and may be configured to execute the technical solution of the method embodiment shown in FIG. 1. An implementation principle and a technical effect of this embodiment are similar to those of the embodiment shown in FIG. 1, and details are not described herein again.

Based on the schematic structural diagram of the communications device shown in FIG. 7, each piece of the control information further carries a count allocation index. The processing module 12 is configured to generate the hybrid automatic repeat request-acknowledgement according to the hybrid automatic repeat request-acknowledgement codebook indication information, including: generating the hybrid automatic repeat request-acknowledgement according to the count allocation index of the control information and the hybrid automatic repeat request-acknowledgement codebook size.

Optionally, the processing module 12 is configured to generate the hybrid automatic repeat request-acknowledgement according to the count allocation index of the control information and the hybrid automatic repeat request-acknowledgement codebook size may be specifically: determining a count allocation index of lost control information or a count allocation index of a code word according to the count allocation index and the hybrid automatic repeat request-acknowledgement codebook size, and generating the hybrid automatic repeat request-acknowledgement according to the received control information and the count allocation index of the lost control information or the count allocation index of the code word.

The communications device may be configured to execute the technical solution of the method embodiment shown in FIG. 2. An implementation principle and a technical effect of this embodiment are similar to those of the embodiment shown in FIG. 2, and details are not described herein again.

Figure 8:
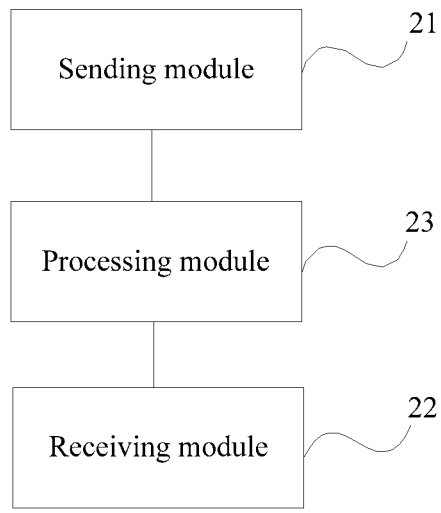
FIG. 8 is a schematic structural diagram of Embodiment 2 of a communications device according to the present invention.

FIG. 8 is a schematic structural diagram of Embodiment 2 of a communications device according to the present invention. As shown in FIG. 8, the communications device in this embodiment may include: a sending module 21, a receiving module 22, and a processing module 23. The sending module 21 is configured to send at least one piece of control information to a receiving device. The at least one piece of control information carries hybrid automatic repeat request-acknowledgement codebook indication information, and the hybrid automatic repeat request-acknowledgement codebook indication information is used to indicate a hybrid automatic repeat request-acknowledgement codebook size. The receiving module 22 is configured to receive the hybrid automatic repeat request-acknowledgement that is sent by the receiving device according to the hybrid automatic repeat request-acknowledgement codebook indication information. The processing module 23 is configured to obtain, according to the hybrid automatic repeat request-acknowledgement, an acknowledgement of each piece of the control information or an acknowledgement of a physical downlink shared channel corresponding to each piece of the control information. A bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

Further, the hybrid automatic repeat request-acknowledgement codebook size includes at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

Further, the bit quantity of the hybrid automatic repeat request-acknowledgement codebook indication information is specifically 2 bits, 3 bits, or 4 bits.

Further, the processing module 23 is further configured to add a count allocation index to the control information.

The communications device in this embodiment may be specifically a sending device, for example, a base station in interaction between the base station and user equipment, or a relay in interaction between the relay and user equipment, and may be configured to execute the technical solution of the method embodiment shown in FIG. 4. An implementation principle and a technical effect of this embodiment are similar to those of the embodiment shown in FIG. 4, and details are not described herein again.

Figure 9:
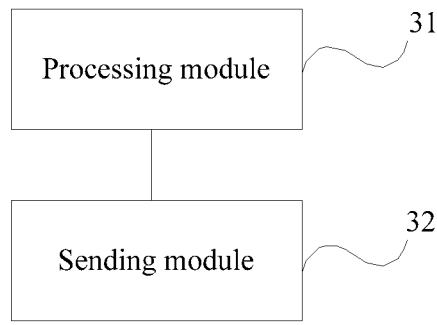
FIG. 9 is a schematic structural diagram of Embodiment 3 of a communications device according to the present invention.

FIG. 9 is a schematic structural diagram of Embodiment 3 of a communications device according to the present invention. As shown in FIG. 9, the communications device in this embodiment may include a processing module 31 and a sending module 32. The processing module 31 is configured to: determine a hybrid automatic repeat request-acknowledgement codebook size, and generate hybrid automatic repeat request-acknowledgement codebook indication information according to the hybrid automatic repeat request-acknowledgement codebook size. The sending module 32 is configured to send the hybrid automatic repeat request-acknowledgement and the hybrid automatic repeat request-acknowledgement codebook indication information to a sending device. A bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

Further, the bit quantity of the hybrid automatic repeat request-acknowledgement codebook indication information is specifically 2 bits, 3 bits, or 4 bits.

The communications device in this embodiment may be specifically a receiving device, for example, user equipment in interaction between a base station and the user equipment, or user equipment in interaction between a relay and the user equipment, and may be configured to execute the technical solution of the method embodiment shown in FIG. 5. An implementation principle and a technical effect of this embodiment are similar to those of the embodiment shown in FIG. 5, and details are not described herein again.

Figure 10:
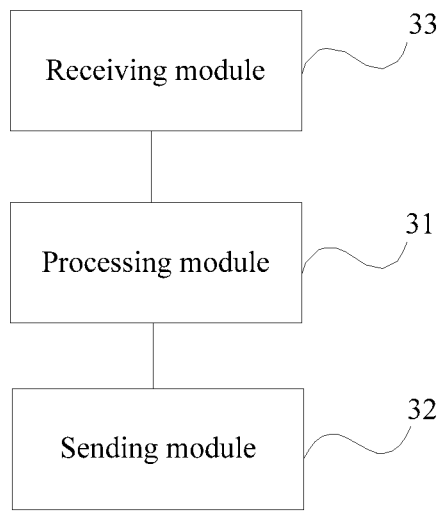
FIG. 10 is a schematic structural diagram of Embodiment 4 of a communications device according to the present invention.

FIG. 10 is a schematic structural diagram of Embodiment 4 of a communications device according to the present invention. As shown in FIG. 10, based on the structure of the communications device shown in FIG. 9, the communications device in this embodiment may further include a receiving module 33. The receiving module 33 is configured to receive at least one piece of control information sent by the device. The control information includes a count allocation index. Correspondingly, the processing module 31 is further configured to generate the hybrid automatic repeat request-acknowledgement according to the count allocation index.

The communications device in this embodiment may be configured to execute the technical solution of the method embodiment shown in FIG. 5. An implementation principle and a technical effect of this embodiment are similar to those of the embodiment shown in FIG. 5, and details are not described herein again.

Figure 11:
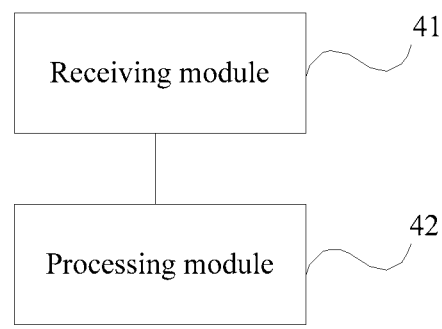
FIG. 11 is a schematic structural diagram of Embodiment 5 of a communications device according to the present invention.

FIG. 11 is a schematic structural diagram of Embodiment 5 of a communications device according to the present invention. As shown in FIG. 11, the communications device in this embodiment may include a receiving module 41 and a processing module 42. The receiving module 41 is configured to receive a hybrid automatic repeat request-acknowledgement and hybrid automatic repeat request-acknowledgement codebook indication information that are sent by a receiving device. The processing module 42 is configured to determine a hybrid automatic repeat request-acknowledgement codebook size according to the hybrid automatic repeat request-acknowledgement codebook indication information. The processing module 42 is further configured to: decode the hybrid automatic repeat request-acknowledgement according to the hybrid automatic repeat request-acknowledgement codebook size, and obtain an acknowledgement of each piece of control information or an acknowledgement of a physical shared channel corresponding to each piece of control information. A bit quantity of the hybrid automatic repeat request-acknowledgement codebook indication information is N, a difference between hybrid automatic repeat request-acknowledgement codebook sizes corresponding to the hybrid automatic repeat request-acknowledgement codebook indication information is at least $2^N+1$, and N is a natural number greater than or equal to 2.

Further, the bit quantity of the hybrid automatic repeat request-acknowledgement codebook indication information is specifically 2 bits, 3 bits, or 4 bits.

The communications device in this embodiment may be specifically a sending device, for example, a base station in interaction between the base station and user equipment, or a relay in interaction between the relay and user equipment, and may be configured to execute the technical solution of the method embodiment shown in FIG. 6. An implementation principle and a technical effect of this embodiment are similar to those of the embodiment shown in FIG. 6, and details are not described herein again.

Figure 12:
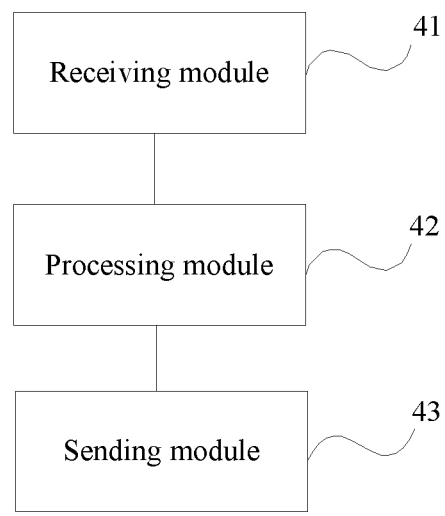
FIG. 12 is a schematic structural diagram of Embodiment 6 of a communications device according to the present invention.

FIG. 12 is a schematic structural diagram of Embodiment 6 of a communications device according to the present invention. As shown in FIG. 12, based on the structure of the communications device shown in FIG. 11, the communications device in this embodiment may further include a sending module 43. The sending module 43 is configured to send at least one piece of control information to the device. The control information includes a count allocation index. The processing module 42 is configured to obtain an acknowledgement of each piece of control information or an acknowledgement of a physical shared channel corresponding to each piece of control information, including: determining the acknowledgement of each piece of the control information or the acknowledgement of the physical shared channel corresponding to each piece of the control information according to the count allocation index.

The communications device in this embodiment can be configured to execute the technical solution of the method embodiment shown in FIG. 6. An implementation principle and a technical effect of this embodiment are similar to those of the embodiment shown in FIG. 6, and details are not described herein again.

It should be noted that the receiving module 11 in the embodiments of the present invention may correspond to a receiver of user equipment, or may correspond to a transceiver of user equipment. The sending module 13 may correspond to a transmitter of the user equipment, or may correspond to the transceiver of the user equipment. The processing module 12 may correspond to a processor of the user equipment. Herein, the processor may be a central processing unit (Central Processing Unit, CPU), or an application-specific integrated circuit (Application Specific Integrated Circuit, ASIC), or one or more integrated circuits that implement the embodiments of the present invention. The user equipment may further include a memory. The memory is configured to store instruction code. The processor invokes the instruction code in the memory, to control the receiving module 11 and the sending module 13 in the embodiments of the present invention to perform the foregoing operations.

The sending module 21 in the embodiments of the present invention may correspond to a transmitter of a base station, of a relay, or of user equipment, or may correspond to a transceiver of a base station, of a relay, or of user equipment. The receiving module 22 may correspond to a receiver of the base station, of the relay, or of the user equipment, or may correspond to the transceiver of the base station, of the relay, or of the user equipment. The processing module 23 may correspond to a processor of the base station, of the relay, or of the user equipment. Herein, the processor may be a CPU, or an ASIC, or one or more integrated circuits that implement the embodiments of the present invention. The base station, the relay, or the user equipment may further include a memory. The memory is configured to store instruction code. The processor invokes the instruction code in the memory, to control the sending module 21 and the receiving module 22 in the embodiments of the present invention to perform the foregoing operations.

The receiving module 33 in the embodiments of the present invention may correspond to a receiver of user equipment, or may correspond to a transceiver of user equipment. The sending module 32 may correspond to a transmitter of the user equipment, or may correspond to the transceiver of the user equipment. The processing module 31 may correspond to a processor of the user equipment. Herein, the processor may be a CPU, or an ASIC, or one or more integrated circuits that implement the embodiments of the present invention. The user equipment may further include a memory. The memory is configured to store instruction code. The processor invokes the instruction code in the memory, to control the receiving module 33 and the sending module 32 in the embodiments of the present invention to perform the foregoing operations.

The sending module 43 in the embodiments of the present invention may correspond to a transmitter of a base station, of a relay, or of user equipment, or may correspond to a transceiver of a base station, of a relay, or of user equipment. The receiving module 41 may correspond to a receiver of the base station, of the relay, or of the user equipment, or may correspond to the transceiver of the base station, of the relay, or of the user equipment. The processing module 42 may correspond to a processor of the base station, of the relay, or of the user equipment. Herein, the processor may be a CPU, or an ASIC, or one or more integrated circuits that implement the embodiments of the present invention. The base station, the relay, or the user equipment may further include a memory. The memory is configured to store instruction code. The processor invokes the instruction code in the memory, to control the sending module 43 and the receiving module 41 in the embodiments of the present invention to perform the foregoing operations.

Figure 13:
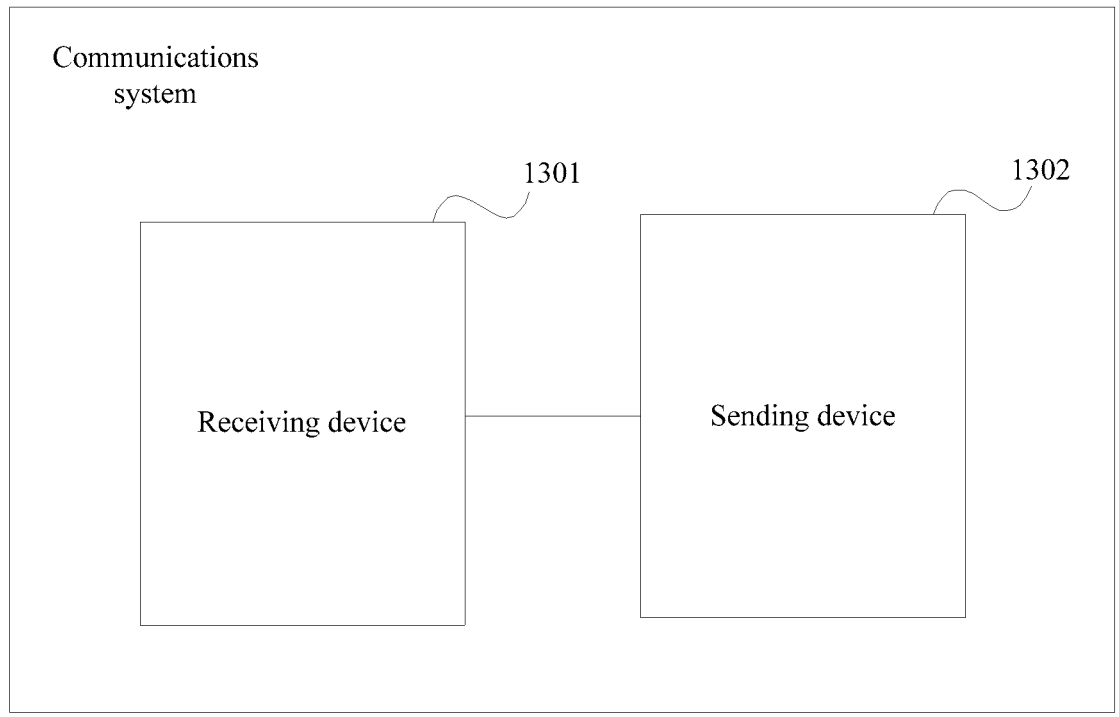
FIG. 13 is a schematic structural diagram of Embodiment 1 of a communications system according to the present invention.

FIG. 13 is a schematic structural diagram of Embodiment 1 of a communications system according to the present invention. As shown in FIG. 13, the system in this embodiment includes a receiving device 1301 and a sending device 1302. The structure in the embodiment in FIG. 7 may be used for the receiving device 1301. Correspondingly, the receiving device 1301 may execute the technical solution of the method embodiment shown in FIG. 1 or FIG. 2. An implementation principle and a technical effect of this embodiment are similar to those of the embodiment shown in FIG. 1 or FIG. 2, and details are not described herein again. The structure in the embodiment in FIG. 8 may be used for the sending device 1302. Correspondingly, the sending device 1302 may execute the technical solution of the method embodiment shown in FIG. 4. An implementation principle and a technical effect of this embodiment are similar to those of the embodiment shown in FIG. 4, and details are not described herein again.

Figure 14:
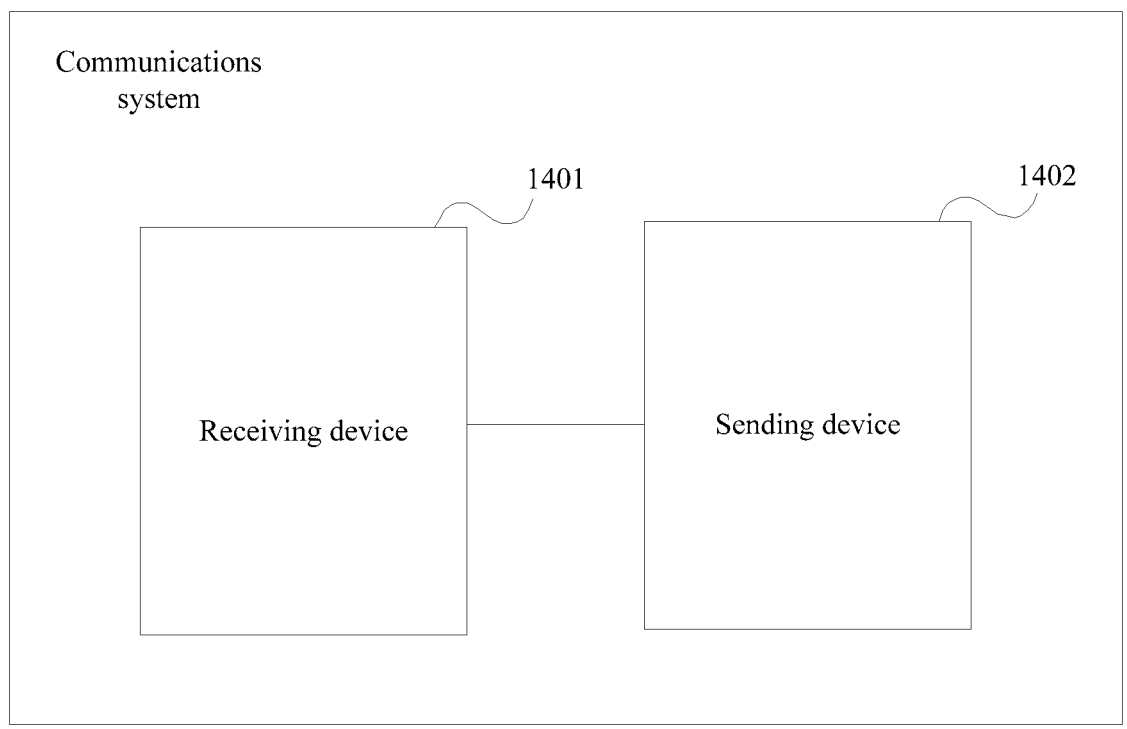
FIG. 14 is a schematic structural diagram of Embodiment 2 of a communications system according to the present invention.

FIG. 14 is a schematic structural diagram of Embodiment 2 of a communications system according to the present invention. As shown in FIG. 14, the system in this embodiment includes a receiving device 1401 and a sending device 1402. The structure in the embodiment in FIG. 9 or FIG. 10 may be used for the receiving device 1401. Correspondingly, the receiving device 1402 may execute the technical solution of the method embodiment shown in FIG. 5. An implementation principle and a technical effect of this embodiment are similar to those of the embodiment shown in FIG. 5, and details are not described herein again. The structure in the embodiment in FIG. 11 or FIG. 12 may be used for the sending device 1402. Correspondingly, the sending device 1402 may execute the technical solution of the method embodiment shown in FIG. 6. An implementation principle and a technical effect of this embodiment are similar to those of the embodiment shown in FIG. 6, and details are not described herein again.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
receiving at least one piece of control information sent by a device, wherein the at least one piece of control information carries hybrid automatic repeat request-acknowledgement codebook indication information, wherein the hybrid automatic repeat request-acknowledgement codebook indication information comprises N bits and corresponds to a set of hybrid automatic repeat request-acknowledgement codebook sizes, wherein a difference between each hybrid automatic repeat request-acknowledgement codebook size in the set corresponding to the hybrid automatic repeat request-acknowledgement codebook indication information is at least $2^N+1$, and N is a natural number greater than or equal to 2;
generating the hybrid automatic repeat request-acknowledgement according to the hybrid automatic repeat request-acknowledgement codebook indication information; and
sending the hybrid automatic repeat request-acknowledgement to the device.

2. The method according to claim 1, wherein the hybrid automatic repeat request-acknowledgement codebook comprises at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

3. The method according to claim 1, wherein a bit quantity of the hybrid automatic repeat request-acknowledgement codebook indication information is 2 bits, 3 bits, or 4 bits.

4. The method according to claim 1, wherein the control information further carries a count allocation index; and
generating the hybrid automatic repeat request-acknowledgement according to the hybrid automatic repeat request-acknowledgement codebook indication information comprises:
generating the hybrid automatic repeat request-acknowledgement according to the count allocation index of the control information and the hybrid automatic repeat request-acknowledgement codebook size.

5. The method according to claim 4, wherein generating the hybrid automatic repeat request-acknowledgement according to the count allocation index of each of the at least one piece of the control information and the hybrid automatic repeat request-acknowledgement codebook size comprises:
determining a count allocation index of lost control information or a count allocation index of a code word according to the count allocation index and the hybrid automatic repeat request-acknowledgement codebook size, and generating the hybrid automatic repeat request-acknowledgement according to the received control information and the count allocation index of the lost control information or the count allocation index of the code word.

6. A method, comprising:
sending at least one piece of control information to a device, wherein the at least one piece of control information carries hybrid automatic repeat request-acknowledgement codebook indication information, wherein the hybrid automatic repeat request-acknowledgement codebook indication information comprises N bits and corresponds to a set of hybrid automatic repeat request-acknowledgement codebook sizes corresponding to the hybrid automatic repeat request-acknowledgement codebook indication information, wherein a difference between each hybrid automatic repeat request-acknowledgement codebook size in the set corresponding to the hybrid automatic repeat request-acknowledgement codebook indication information is at least $2^N+1$, and N is a natural number greater than or equal to 2;
receiving a hybrid automatic repeat request-acknowledgement that is sent by the device according to the hybrid automatic repeat request-acknowledgement codebook indication information; and
obtaining, according to the hybrid automatic repeat request-acknowledgement, an acknowledgement of each piece of the control information or an acknowledgement of a physical downlink shared channel corresponding to each piece of the control information.

7. The method according to claim 6, wherein the hybrid automatic repeat request-acknowledgement codebook comprises at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

8. The method according to claim 6, wherein a bit quantity of the hybrid automatic repeat request-acknowledgement codebook indication information is 2 bits, 3 bits, or 4 bits.

9. The method according to claim 6, wherein the method further comprises:
adding a count allocation index to the control information.

10. An apparatus, comprising:
a storage medium including executable instructions; and
a processor;
wherein the executable instructions, when executed by the processor, causes the processor to:
receive at least one piece of control information sent by a device, wherein the at least one piece of control information carries hybrid automatic repeat request-acknowledgement codebook indication information, wherein the hybrid automatic repeat request-acknowledgement codebook indication information comprises N bits and corresponds to in a set of hybrid automatic repeat request-acknowledgement codebook sizes corresponding to the hybrid automatic repeat request-acknowledgement codebook indication information, wherein a difference between each hybrid automatic repeat request-acknowledgement codebook size in the set corresponding to the hybrid automatic repeat request-acknowledgement codebook indication information is at least $2^N+1$, and N is a natural number greater than or equal to 2;

generate a hybrid automatic repeat request-acknowledgement according to the hybrid automatic repeat request-acknowledgement codebook indication information; and send the hybrid automatic repeat request-acknowledgement to the device.

11. The apparatus according to claim 10, wherein the hybrid automatic repeat request-acknowledgement codebook size comprises at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

12. The apparatus according to claim 10, wherein a bit quantity of the hybrid automatic repeat request-acknowledgement codebook indication information is 2 bits, 3 bits, or 4 bits.

13. The apparatus according to claim 10, wherein the control information further carries a count allocation index; and generating the hybrid automatic repeat request-acknowledgement according to the hybrid automatic repeat request-acknowledgement codebook indication information, comprises:

generating the hybrid automatic repeat request-acknowledgement according to the count allocation index of the control information and the hybrid automatic repeat request-acknowledgement codebook size.

14. The apparatus according to claim 13, wherein generating the hybrid automatic repeat request-acknowledgement according to the count allocation index of each of the at least one piece of the control information and the hybrid automatic repeat request-acknowledgement codebook size, comprises:

determining a count allocation index of lost control information or a count allocation index of a code word according to the count allocation index and the hybrid automatic repeat request-acknowledgement codebook size, and generating the hybrid automatic repeat request-acknowledgement according to the received control information and the count allocation index of the lost control information or the count allocation index of the code word.

15. An apparatus, comprising:

a storage medium including executable instructions; and a processor;

wherein the executable instructions, when executed by the processor, causes the processor to perform:

sending at least one piece of control information to a device, wherein the at least one piece of control information carries hybrid automatic repeat request-acknowledgement codebook indication information, and the hybrid automatic repeat request-acknowledgement codebook indication information comprises N bits and corresponds to a set of hybrid automatic repeat request-acknowledgement codebook sizes corresponding to the hybrid automatic repeat request-acknowledgement codebook indication information, wherein a difference between each hybrid automatic repeat request-acknowledgement codebook size in the set corresponding to the hybrid automatic repeat request-acknowledgement codebook indication information is at least $2^N+1$, and N is a natural number greater than or equal to 2;

receiving a hybrid automatic repeat request-acknowledgement that is sent by the device according to the hybrid automatic repeat request-acknowledgement codebook indication information; and obtaining, according to the hybrid automatic repeat request-acknowledgement, an acknowledgement of each piece of the control information or an acknowledgement of a physical downlink shared channel corresponding to each piece of the control information.

16. The apparatus according to claim 15, wherein the hybrid automatic repeat request-acknowledgement codebook size comprises at least one of a quantity of the control information or a quantity of physical shared channels corresponding to the control information, a quantity of code words of a physical shared channel corresponding to the control information, a quantity of physical control channels of a semi-persistent scheduling release, or a quantity of code words of a physical control channel of a semi-persistent scheduling release.

17. The apparatus according to claim 15, wherein a bit quantity of the hybrid automatic repeat request-acknowledgement codebook indication information is 2 bits, 3 bits, or 4 bits.

18. The apparatus according to claim 15, wherein the executable instructions, when executed by the processor, further causes the processor to perform:

adding a count allocation index to the control information.

* * * * *